(12) United States Patent
Dong

(10) Patent No.: US 11,740,411 B2
(45) Date of Patent: Aug. 29, 2023

(54) OPTICAL COUPLERS AND HYBRIDS

(71) Applicant: II-VI Delaware, Inc., Wilmington, DE (US)

(72) Inventor: Po Dong, Cupertino, CA (US)

(73) Assignee: II-VI DELAWARE, INC., Wilmington, DE (US)

(*) Notice: Subject to any disclaimer, the term of this patent is extended or adjusted under 35 U.S.C. 154(b) by 0 days.

(21) Appl. No.: 17/660,072

(22) Filed: Apr. 21, 2022

(65) Prior Publication Data

US 2022/0244463 A1 Aug. 4, 2022

Related U.S. Application Data

(62) Division of application No. 17/027,440, filed on Sep. 21, 2020, now Pat. No. 11,333,831.

(51) Int. Cl.
| | |
|---|---|
| *G02B 6/27* | (2006.01) |
| *G02B 6/293* | (2006.01) |
| *G02B 6/122* | (2006.01) |
| *G02B 6/12* | (2006.01) |

(52) U.S. Cl.
CPC ....... *G02B 6/2773* (2013.01); *G02B 6/29301* (2013.01); *G02B 6/29302* (2013.01); *G02B 6/29344* (2013.01); *G02B 6/29379* (2013.01); *G02B 6/1228* (2013.01); *G02B 2006/1215* (2013.01); *G02B 2006/12119* (2013.01)

(58) Field of Classification Search
CPC ................ G02B 6/1228; G02B 6/2773; G02B 6/29301; G02B 6/29302; G02B 6/29344; G02B 6/29379; G02B 2006/12119; G02B 2006/1215
See application file for complete search history.

(56) References Cited

U.S. PATENT DOCUMENTS

| | | | | |
|---|---|---|---|---|
| 4,887,314 | A * | 12/1989 | Carroll | H04B 10/61 375/334 |
| 8,401,351 | B2 * | 3/2013 | Inoue | G02B 6/125 359/325 |
| 8,526,102 | B2 * | 9/2013 | Inoue | H04B 10/613 359/325 |

(Continued)

OTHER PUBLICATIONS

Cao, Liang et al.; "Adiabatic couplers in SOI waveguides"; 2010; Rochester Institute of Technology; 978-1-55752-890-2.

(Continued)

*Primary Examiner* — Ryan A Lepisto
(74) *Attorney, Agent, or Firm* — Blank Rome LLP

(57) ABSTRACT

An optical circuit for routing a signal includes a coupler and first and second waveguides. The coupler has an input for the signal and has first and second outputs. The first waveguide has a first optical connection to the first output, and the second waveguide has a second optical connection to the second output. Both waveguides have the same propagation length. The first and second waveguides include different widths at the respective optical connections to the respective outputs. This coupler can be used with another input coupler, two additional waveguides, and two 2×2 output couplers to provide a 90-degree hybrid for mixing signal light and local oscillator light in a coherent receiver or the like.

20 Claims, 3 Drawing Sheets

(56) References Cited

U.S. PATENT DOCUMENTS

| | | | | |
|---|---|---|---|---|
| 8,649,643 | B2* | 2/2014 | Jeong | G02B 6/12 385/39 |
| 8,861,902 | B2* | 10/2014 | Bontempi | H04B 10/60 398/43 |
| 8,885,989 | B2* | 11/2014 | Jeong | H04B 10/615 385/14 |
| 9,020,367 | B2* | 4/2015 | Jones | H04L 27/223 398/208 |
| 10,126,498 | B1* | 11/2018 | Ma | G02F 1/011 |
| 10,459,175 | B2 | 10/2019 | Sugiyama | |
| 10,520,672 | B2 | 12/2019 | Ma et al. | |
| 10,731,383 | B2* | 8/2020 | Yamazaki | H04B 10/615 |
| 10,935,726 | B1 | 3/2021 | Lee et al. | |
| 11,223,425 | B2* | 1/2022 | Oka | H04B 10/60 |
| 2014/0086595 | A1* | 3/2014 | Yamazaki | G02B 6/125 156/280 |
| 2017/0139136 | A1 | 5/2017 | Oka | |
| 2019/0049665 | A1* | 2/2019 | Ma | H01L 33/58 |
| 2021/0103100 | A1* | 4/2021 | Sobu | G02B 6/2804 |
| 2021/0273730 | A1 | 9/2021 | Oka | |
| 2021/0294038 | A1* | 9/2021 | Oka | G02B 6/29344 |

OTHER PUBLICATIONS

Guan, Hang et al.; "Compact and low loss 90° optical hybrid on a silicon-on-insulator platform"; Optics Express; Nov. 13, 2017; vol. 25; No. 23; pp. 28957-28968.

Halir, R. et al.; "High performance multimode interference couplers for coherent communications in silicon"; www.ic.uma.es; ETSI Telecomunicación, Universidad de Málaga, 29010 Málaga, Spain; INTEC, Ghent University-Interuniversify Microelectronics Center, 9000 Gent, Belgium.

Millan-Mejia, A.J. et al.; "1x2 Multimode interference coupler with ultra-low reflections in membrane photonic integrated circuits"; 19th European Conference on Integrated Optics; pp. 1-2.

Nasu, Yusuke et al.; "Temperature insensitive and ultra wideband silica-based dual polarization optical hybrid for coherent receiver with highly symmetrical interferometer design"; Optics Express; Dec. 12, 2011; vol. 19; No. 26; pp. B112-B118.

Optoplex Corporation; "Optical Hybrid Enables Next-Generation Optical Communication"; www.optoplex.com; pp. 1-5.

Rana, Farhan; "Integrated Optical Waveguides"; Semiconductor Optoelectronics; Cornell University; Chapter 8; pp. 1-14.

Riesen, Nicolas et al.; "Design of mode-sorting asymmetric Y-junctions"; Applied Optics; vol. 51; No. 15; May 20, 2012; pp. 2778-2783.

Selvaraja, Shankar Kumar et al.; "Review on Optical Waveguides"; Chapter 6; IntechOpen; 2018; http://dx.dol.org/10.5772/Intechopen.77150; pp. 95-129.

Solehmainen, Kimmo et al.; "Adiabatic and Multimode Interference Couplers on Silicon-on-Insulator"; IEEE Photonics Technology Letters; 2006; vol. 18; No. 21; pp. 2287-2289.

Tamir, Theodor et al.; "Guided-Wave Optoelectronics"; Springer Series in Electronics and Photonics 26; Second Edition; p. 62.

* cited by examiner

OPTICAL COUPLERS AND HYBRIDS

CROSS-REFERENCE TO RELATED APPLICATIONS

This is a divisional of U.S. application Ser. No. 17/027,440 filed Sep. 21, 2020, which is incorporated herein by reference in its entirety.

FIELD OF THE DISCLOSURE

The subject matter of the present disclosure relates to a photonic integrated circuit, and more particularly relates to an optical hybrid formed of an optical coupler network.

BACKGROUND OF THE DISCLOSURE

A coherent receiver can be used in coherent optical transmission and in light detection and ranging (LiDAR) applications. Coherent detection at the receiver typically requires an optical hybrid, such as a 90-degree optical mixer, which mixes signal light (S) with local oscillator light (LO) at the receiver so quadrature phase shift keyed (QPSK) modulation can be used. Highly-Integrated Photonic Integrated Circuits (PICs) are the preferred type of device for these applications.

In general, a 90-degree optical hybrid is a device having two input ports and having four output ports. One input port receives signal light "SIG", while the other input port receives local oscillator light "LO". Inside its configuration, the optical hybrid 10 provides a mixture of the signal light (SIG) and the local oscillator (LO) light at each of the four output ports with an optical phase difference incremented by 90-degrees from output to output. When used in a receiver with two pairs of balanced photodetectors (not shown) at the outputs, the receiver can demodulate two quadrature components of an optical QPSK modulation in the received signal light (SIG).

Although optical hybrids of the prior art may be effective for their purposes, an optical hybrid preferably provides a precise phase relationship between its outputs. Phase errors can lower the PIC yield significantly. Therefore, an optical hybrid preferably has minimized phase errors so that the PIC yield can be higher.

The subject matter of the present disclosure is directed to overcoming, or at least reducing the effects of, one or more of the problems set forth above.

SUMMARY OF THE DISCLOSURE

According to the present disclosure, an optical circuit is used for routing a signal. The optical circuit comprises a coupler and first and second waveguides. The coupler has an input for the signal and has first and second outputs. The first waveguide has a first optical connection to the first output and has a propagation length. The second waveguide has a second optical connection to the second output and has the same propagation length as the first waveguide. However, the first and second optical waveguides comprise different input widths at the respective optical connections to the respective outputs.

According to the present disclosure, an optical circuit is used for mixing first and second signals. The optical circuit comprises input couplers, four waveguides, and output couplers. The input couplers for each of the first and second signals each comprises a first input and two first outputs. The four waveguides each has a first optical connection to one of the first outputs of the input couplers, and each of four waveguides has a same propagation length. The output couplers each comprises two second inputs and two second outputs. Each of the second inputs has a second optical connection to one of the four waveguides. At least two of the waveguides comprise different input widths at the first optical connections to the two first outputs of at least one of the input couplers.

An optical coherent receiver can comprise the optical circuit as described above. Likewise, an optical coherent receiver can comprise two optical circuits as described above, each being connected to one of two polarized signals from two polarization beam splitters.

The foregoing summary is not intended to summarize each potential embodiment or every aspect of the present disclosure.

DETAILED DESCRIPTION OF THE DISCLOSURE

The present disclosure is directed to an optical circuit, where the required phase difference is achieved by waveguides having different widths. Using this configuration in a 90-degree optical hybrid, for example, the fabrication tolerance can be significantly increased.

Figure 1:
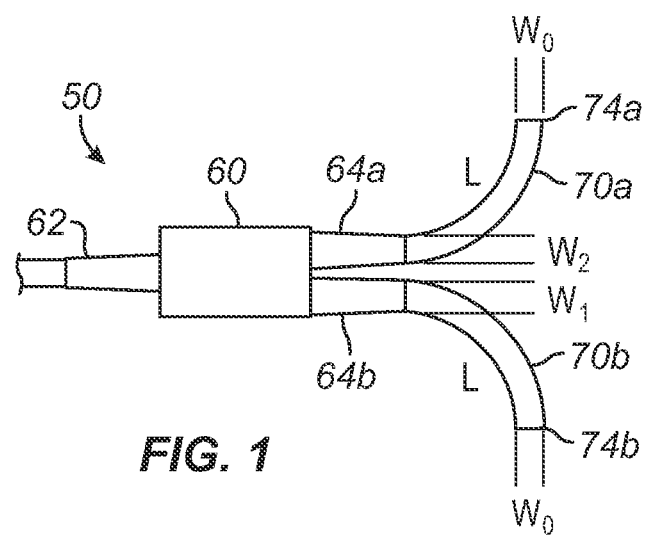
FIG. 1 schematically illustrates a coupler according to the present disclosure.

In one configuration as shown in FIG. 1, an optical circuit 50 of the present disclosure includes a coupler 60, which can be a 1×2 coupler. The coupler 60 includes at least one input 62 to receive a signal from an input waveguide and includes two output 64a-b. Output waveguides 70a-b connect at optical connections to the outputs 64a-b and have different waveguide widths ($W_1$, $W_2$). After propagation of the light signal a certain propagation length (L) through the waveguides 70a-b, a desired phase difference can be achieved between the two outputs 74a-b of these waveguides 70a-b. The waveguide widths ($W_1$, $W_2$) may be gradually changing during the propagation through 70a and 70b.

As will be appreciated, the effective refractive index $n_{\text{eff}}$ the waveguides 70a-b is a function of their widths ($W_1$, $W_2$). In particular, the effective refractive index $n_{\text{eff}}$ for light propagated in the waveguides 70a-b is analogous to wavenumber (i.e., the change in phase per unit length) caused by a medium. For a given wavelength, the phase constant ($\beta$) of the waveguide 70a-b is given by the effective index $n_{\text{eff}}$ times the vacuum wavenumber:

$$\beta = n_{\text{eff}} \frac{2\pi}{\lambda}.$$

The values of the phase constant ($\beta$) are mode-dependent and frequency-dependent and can be calculated with numerical solutions that depend on the refractive index profile of the waveguides 70a-b.

The effective index $n_{eff}$ depends on the waveguide's cross-section, waveguide materials, and the cladding material. As is known, a mode is characterized by an invariant transversal intensity profile and the effective index $n_{eff}$. Each mode propagates through the waveguides 70a-b with a phase velocity of $c/n_{eff}$, where c denotes the speed of light in vacuum and $n_{eff}$ is the effective refractive index of that mode. Accordingly, the dimensions of the waveguides 70a-b determine which modes can exist and the value of $n_{eff}$.

Overall, the effective index $n_{eff}$ of the waveguides 70a-b depends on the widths of the waveguides 70a-b and the propagation distance (L). Phase differences accumulate through the waveguides 70a-b over the propagation distance (L). By configuring the widths ($W_1$, $W_2$) of the waveguides 70a-b and configuring the propagation length (L) afterward, a prescribed phase difference can be achieved at the terminations 74a-b of the waveguides 70a-b. Based on the details of an implementation, the component size, the materials, etc., numerical methods can compute the characteristics of the waveguides 70a-b to achieve this goal of a prescribed phase difference at the terminations 74a-b.

As will be appreciated, the effective index $n_{eff}$ for the waveguides 70a-b implemented in silicon photonics is typically determined based on a numerical solution because there is no analytical solution available. Therefore, the widths ($W_1$, $W_2$) of the waveguides 70a-b to achieve the desired phase difference are optimized based on numerical simulations for the implementation at hand. For example, finite-difference time domain (FDTD), beam propagation methods, eigenmode expansion methods, or other approximation techniques can be used to optimize the differences in widths ($W_1$, $W_2$) of the waveguides 70a-b for the particular implementation.

In some implementations, the widths ($W_1$, $W_2$) of the waveguides 70a-b from the two outputs 64a-b of the coupler 60 may be gradually tapered to the same width ($W_0$) at the terminations 74a-b, as shown in FIG. 1. This depends on the additional components to which the circuit 50 is connected. In other cases, the tapering of the waveguides 70a-b to the same width ($W_0$) may not be necessary.

Figure 2A:
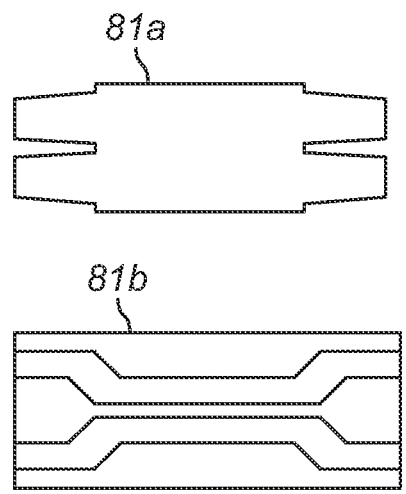
FIGS. 2A-2B illustrate different implementations of couplers for the present disclosure.

As shown in FIG. 1, the coupler 60 can be a 1×2 multi-mode interference (MMI) coupler. Other couplers can be used, such as a Y-junction coupler 61 shown in FIG. 2A. Another coupler that can be used for input includes an adiabatic coupler.

For their part, the waveguides 70a-b can have any number of available structures, including cores with cladding (e.g., optical fibers) or channel waveguides that are buried, strip-loaded, ridge, rib, diffused, etc. The waveguides 70a-b can be composed of suitable materials, such as silicon (Si), SOI, InP, InP/InGaAsP, InGaAs-AlGaInAs, $LiNbO_3$, other semiconductor materials, photonic crystals, etc.

In general, the optical circuit 50 of the present disclosure includes an N×M coupler (60) having N input ports (62) and M output ports (64). Here, N is larger or equal to 1, while M is larger or equal to 2. At least two outputs (64) among the M outputs have different waveguide widths ($W_1$, $W_2$). By configuring the widths ($W_1$, $W_2$) and the following propagation lengths (L) afterwards, a desired phase shift can be achieved among the different output terminations (74).

Figure 3:
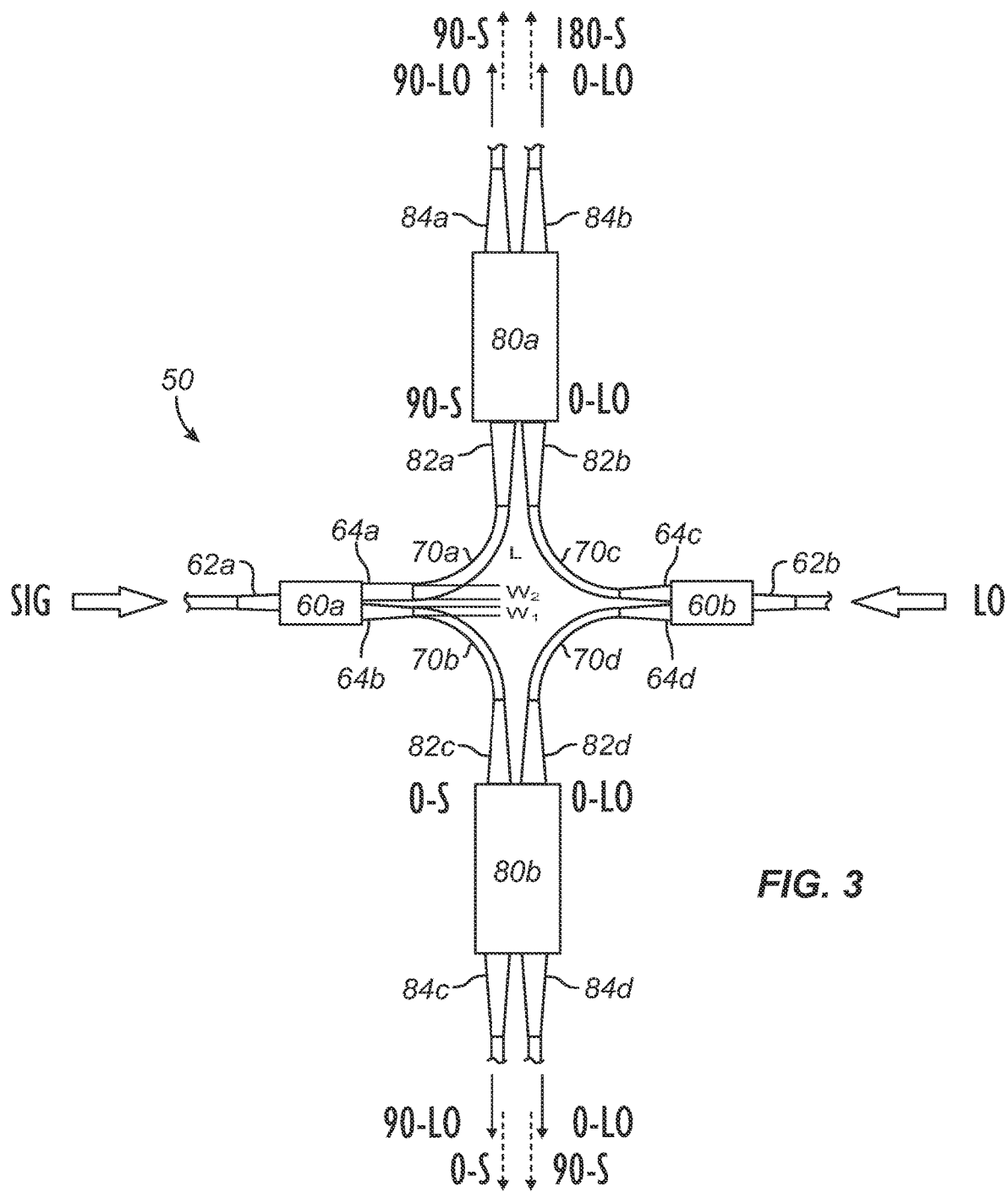
FIG. 3 illustrates a 90-degree optical hybrid according to the present disclosure.

As an example, the above coupler 60 in FIG. 1 can be used to construct a 90-degree optical hybrid as shown in the optical circuit 50 of FIG. 3. Here, the optical circuit 50 can achieve the 90-degree phase shift between outputs by using two input couplers 60a-b and using two output couplers 80a-b. As diagramed, the input couplers 60a-b can be 1×2 couplers or splitters, and the output couplers 80a-b can be 2×2 couplers or combiners. At least one of the two input couplers (e.g., coupler 60a) has outputs with waveguides 70a-b of different widths ($W_1$, $W_2$) to provide the required phase difference. The other input coupler 60b may be a phase symmetric optical splitter.

Instead of using at least three 2×2 couplers as used in the prior art configurations, the present optical circuit 50 use two 1×2 input couplers 60a-b and uses two 2×2 output couplers 80a-b. The needed 90-degree phase difference can be obtained by properly configuring the waveguide widths ($W_1$, $W_2$) after at least one of the 1×2 input couplers (i.e., 60a). All four of the waveguides 70a-d connecting the couplers 60a-b, 80a-b have the same physical lengths (L).

Figure 2B:
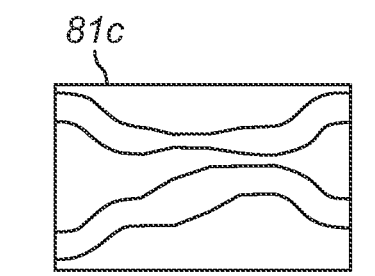

As noted previously, the input couplers 60a-b can include an MMI coupler, a Y-junction coupler, or an adiabatic coupler. For their part, the output couplers 80a-b can include a number of couplers. As shown in FIG. 2B, for example, these output couplers can include a 2×2 MMI coupler (81a), a 2×2 directional coupler (81b), a 2×2 adiabatic coupler (81c). These output couplers can each be a 90-degree optical combiner.

As shown in FIG. 3, the optical circuit 50 has relatively short waveguide interconnects and can operate as a 90-degree optical hybrid. Implemented as a photonic integrated circuit, the optical circuit 50 has the four optical couplers 60a-b and 80a-b disposed upon a substrate (not shown) so the couplers 60a-b, 80a-b can face inward toward one another.

Each of the inner ends of the four couplers 60a-b, 80a-b has two optical outputs 64a-d, 84a-d interconnected with the four optical waveguides 70a-d in a compact arrangement. The opposing input couplers 60a-b respectively split an input 62a-b into two outputs 64a-b, 64c-d. The opposing output couplers 80a-b have two inputs 82a-b, 82c-d respectively and have two outputs 84a-b, 84c-d respectively. Each waveguide 70a-d connects one of the output 64a-d of the input couplers 60a-b to the input 82a-d of an adjacent output coupler 80a-b so that the waveguides 70a-d are arranged a non-intersecting manner without waveguide crossings.

As disclosed herein, the optical circuit 50 can be used as an optical mixer, wherein light received by the two input couplers 60a-b is mixed by the circuit 50 and exits from the outputs 84a-d on the output couplers 80a-b. During operation, for example, an optical signal (SIG) is provided at the input 62a of a first input coupler 60a via a first input waveguide, while a reference optical signal, such as LO light, is provided at the input 62b of a second input coupler 60b via a second input waveguide. Of course, the signal SIG light and the LO light may be switched.

The input coupler 60a outputs the signal light SIG from the outputs 64a-b, and the other input coupler 60b outputs the LO light from the outputs 64c-d. The waveguides 70a-b from the signal's outputs 64a-b having the same physical length (L) (but different widths) guide the signal (SIG) light from the output 64a-b into the adjacent inputs 82a, 82c of each of the output couplers 80a-b at a desired phase difference (i.e., 90-degrees). Each of the output couplers 80a-b then split the signal (SIG) light into two preferably equal portions, and couple them into the respective two outputs 84a-d of the corresponding couplers 80a-b adding a 90-degree phase shift therebetween.

Concurrently, the other optical waveguides 70c-d from the LO's outputs 64c-d having the same physical length (L) (and same width) guide the LO light from the outputs 64c-d into the adjacent inputs 82b, 82d of each of the output couplers 80a-b. Each of the couplers 80a-b then split the LO light into two preferably equal portions, and couple them into the respective two outputs 84a-d of the corresponding coupler 80a-b with the added 90-degree phase shift therebetween.

As noted, at least one of these input couplers (e.g., 60a) can be phase symmetric so that the outputs have substantially the same phase, possibly subject to some small phase errors in the coupler. However, as noted, at least one of the input couplers (60a) can output to waveguides 70a-d of different widths ($W_1$, $W_2$) so that the output light has a 90-degree phase shift therebetween after traversing the length (L) of the respective waveguides.

In FIG. 3, the first input coupler 60a for the signal light (SIG) has outputs 64a-b to waveguides 70a-b of different widths ($W_1$, $W_2$) according to the present disclosure. Other configurations can be used. For example, the second input coupler 60b for the LO light (LO) may instead have this configuration, or both of the input couplers 60a-b may have these configurations, as long as desired phase differences can be achieved at the outputs of the circuit 50.

As a result, the four outputs 84a-d of the output couplers 80a-b output mixed signal SIG light and LO light at incremented phase shifts of 90-degree from port to port. Additional waveguides can then guide the mixed signal SIG light and LO light with incremented 90-degree phase shifts from the respective output ports 84a-d to other optical elements for processing, which can be arranged at the two opposite edges of a chip on which the optical circuit 50 is formed. These other optical elements can include those found in a coherent receiver. In the coherent receiver, for example, waveguides at the inputs 62a-b can be connected to optical fibers, and waveguides at the outputs 84a-d can be coupled to photodiodes via lensing.

As shown in FIG. 3, the optical circuit 50 has the couplers 60a-b, 80a-b arranged along two orthogonal axes in a cross-like arrangement. This represents a compact configuration that advantageously allows each of the interconnects for the waveguides 70a-d to be of equal length (L) and each at a 90-degree waveguide bend. A radius of the waveguide bend defines the allowable distance between the ends of the opposing couplers 60a-b, 80a-b and can be restricted by limitations on radiative loss in the waveguide bends.

Figure 4:
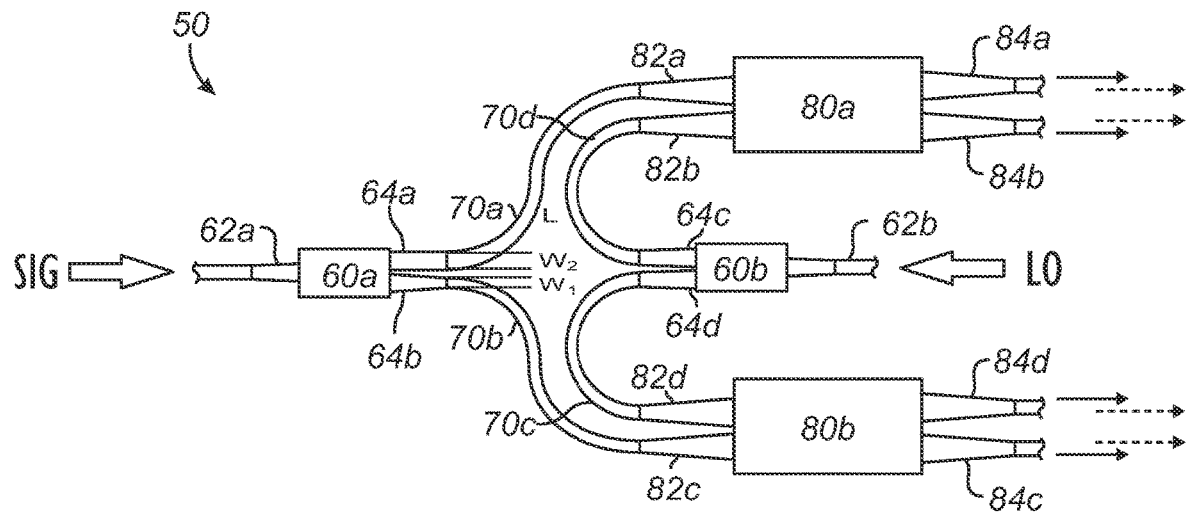
FIG. 4 illustrates another 90-degree optical hybrid according to the present disclosure.

Although this cross-configuration is used in FIG. 3, other configurations could be used. For example, FIG. 4 illustrates another optical hybrid 50 according to the present disclosure in another configuration. Here, the waveguides 70a-b from one input coupler 60a use S-bends to connect to respective inputs 82a, 82c of output couplers 80a-b. The other input coupler 60b uses 180-degree waveguides 70c-d to connect to respective inputs 82b, 82d of the output couplers 80a-b. Details concerning the widths ($W_1$, $W_2$) and lengths (L) of the waveguides 70a-d for at least one of the input couplers (e.g., 60a) are the same as disclosed previously. This compact arrangement may be suitable for a given implementation, depending on the device in which the hybrid 50 is used, the amount of space available, etc.

As noted, the optical circuits 50 of the present disclosure may be implemented in a chip as a photonic integrated circuit (PIC) device. The optical circuits 50 can have high fabrication tolerances because the connecting waveguides 70a-d have the same physical lengths (L) and can be very short. In addition, the input couplers 60a-b can have lower insertion loss and broader bandwidth than the output couplers 80a-b, and hence more fabrication tolerance.

Figure 5:
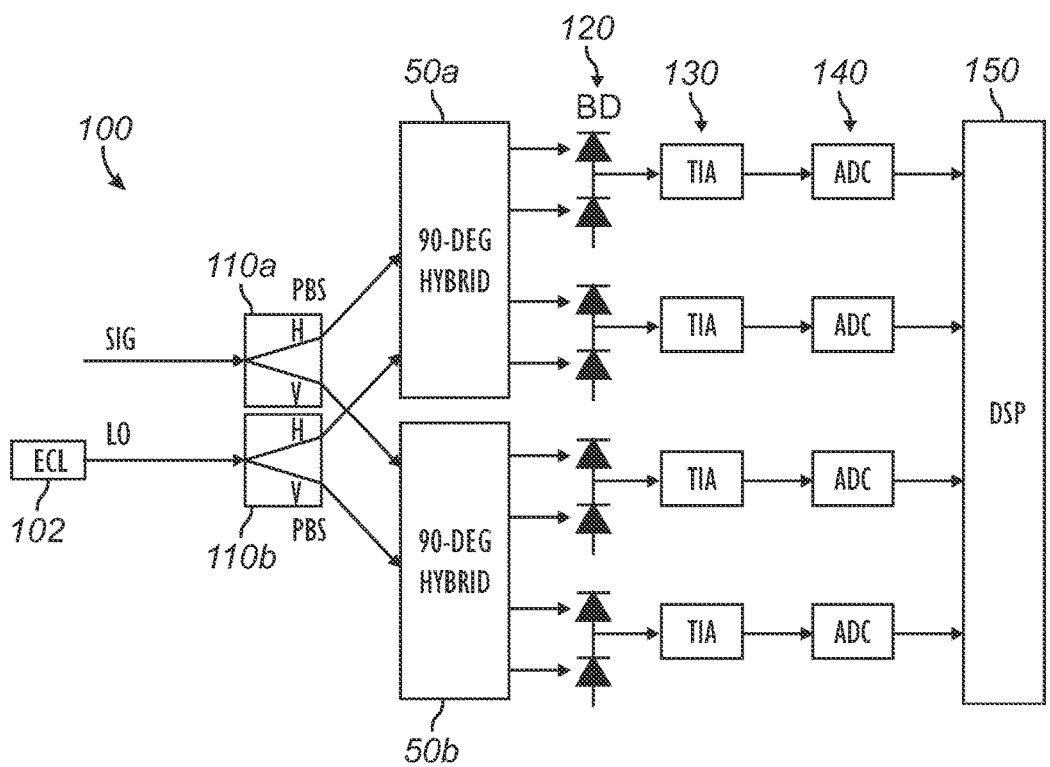
FIG. 5 illustrates a coherent receiver having 90-degree optical hybrids according to the present disclosure.

The optical circuits 50 of the present disclosure can be used in a number of different implementations and devices. As one example, FIG. 5 diagrams the structure of a coherent receiver 100, which can use optical circuit 50a-b for the 90-degree optical hybrid disclosed herein.

The local oscillator LO signal can be provided by an external cavity laser 102 or the like. The signal (SIG) light and LO light pass through polarization beam splitters 110a-b. Horizontally polarized light passes to one of the 90-degree optical hybrids 50a, while vertically polarized light passes to the other hybrid 50b. Internally, the hybrids 50a-b shift the phase of the SIG light and LO light as noted above. For each hybrid 50a-b, first outputs from one of the output couplers (80a) are optically imaged on first balanced detectors 120, while second outputs for the other output couplers (80b) are optically imaged on other balanced detectors 120. The balanced detectors 120 connect to transimpedance amplifiers 130 and analog-to-digital converters 140, which provide the signals to a digital signal processor DSP circuitry 150 for processing based on quadrature phase shift keyed (QPSK) modulation or some other in-phase/quadrature modulation used.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. An optical receiver circuit, comprising:
   an optical hybrid configured to mix first and second signals, the optical hybrid comprising:
   input couplers for each of the first and second signals, each input coupler comprising a first input and two first outputs, the input couplers being configured to output the respective first and second signal at the first outputs;
   four waveguides each having a first optical connection to one of the first outputs of the input couplers, each of four waveguides having a same propagation length, at least two of the waveguides comprising different input widths at the first optical connections to the two first outputs of at least one of the input couplers and comprising a same output width at terminations of the propagation length, the different input widths being configured to produce a phase difference in the respective first and second signal along the propagation length to the terminations; and
   output couplers each comprising two second inputs and two second outputs, each of the second inputs having a second optical connection to one of the four waveguides, the second outputs for the output couplers being configured to output a 90-degree optical hybrid mix of the first and second signals with an optical phase difference incremented by 90-degrees from output to output.

2. The optical receiver circuit of claim 1, wherein a first pair of the four waveguides for both of first and second of the input couplers connect to a first of the output couplers; and wherein a second pair of the four optical waveguides from both of the first and second input couplers connect to a second of the output couplers.

3. The optical receiver circuit of claim 2, wherein first and second input couplers are disposed opposite one another; wherein the first and second output couplers are disposed opposite one another offset from the first and second input couplers; and wherein the four optical waveguides comprise 90-degree bends arranged in a non-intersecting manner.

4. The optical receiver circuit of claim 3, wherein first and second input couplers are disposed opposite one another; wherein the first and second output couplers are disposed on either side of the second input coupler; wherein the first pair of the four waveguides from the first input coupler comprise S-bends each connected to one of the second inputs of the first and second output couplers; and wherein the second pair of the four waveguides from the second input coupler comprise 180-degree bends each connected to another of the second inputs of the first and second output couplers.

5. The optical receiver circuit of claim 1, wherein the input couplers each comprises a 1×2 multi-mode interference coupler, a Y-junction coupler, or a 1×2 adiabatic coupler.

6. The optical receiver circuit of claim 1, wherein the output couplers each comprises a 2×2 multi-mode interference coupler, a 2×2 directional coupler, or a 2×2 adiabatic coupler.

7. The optical receiver circuit of claim 1, wherein the output couplers each comprises a 90-degree optical combiner.

8. The optical receiver circuit of claim 1, wherein at least one of the input couplers comprises a phase symmetric optical splitter.

9. The optical receiver circuit of claim 1, wherein an intermediate width of at least one of the at least two waveguides with the different input widths changes gradually along the propagation length from the input width to an output width.

10. The optical receiver circuit of claim 1, further comprising an external cavity laser configured to generate the second signal as a local oscillator signal.

11. The optical receiver circuit of claim 1, further comprising processing circuitry being configured to process the 90-degree optical hybrid mix based on quadrature phase shift keyed (QPSK) modulation.

12. The optical receiver circuit of claim 11, wherein the processing circuitry comprises:
    a first pair of balanced detectors being configured to detect a first set of the 90-degree optical hybrid mix from the second outputs of one of the output couplers; and
    a second pair of balanced detectors being configured to detect a second set of the 90-degree optical hybrid mix from the second outputs of another of the output couplers.

13. The optical receiver circuit of claim 12, wherein the processing circuitry comprises a transimpedance amplifier and an analog-to-digital converter in electrical communication with each of the first and second pairs of balanced detectors.

14. The optical receiver circuit of claim 12, wherein at least the optical hybrid is implemented as a photonic integrated circuit (PIC) device.

15. An optical coherent receiver, comprising:
    a first polarization beam splitter being configured to split a first input signal into first polarized signals, one of the first polarized signals having a first polarization, another of the first polarized signals having a second polarization orthogonal to the first polarization;
    a second polarization beam splitter being configured to split a second input signal into second polarized signals, one of the second polarized signals having the first polarization, another of the second polarized signals having the second polarization;
    a first optical hybrid according to claim 8 in optical communication with the first and second polarized signals having the first polarization, the first optical hybrid being configured to output first outputs of a first 90-degree optical hybrid mix of the first and second signals with an optical phase difference incremented by 90-degrees from output to output;
    a second optical hybrid according to claim 8 in optical communication with the first and second polarized signals having the second polarization, the second optical hybrid being configured to output second outputs of a second 90-degree optical hybrid mix of the first and second signals with the optical phase difference incremented by 90-degrees from output to output; and
    processing circuitry in communication with the first and second outputs of the first and second optical hybrids.

16. The optical coherent receiver of claim 15, further comprising an external cavity laser configured to generate the second input signal as a local oscillator signal.

17. The optical coherent receiver of claim 15, wherein processing circuitry comprises:
    first pairs of balanced detectors, one pair of the first pairs in optical communication with a first set of the first outputs, another pair of the first pairs in optical communication with a second set of the first outputs; and
    second pairs of balanced detectors, one of the second pairs in optical communication with a first set of the second outputs, another of the second pairs in optical communication with a second set of the second outputs.

18. The optical coherent receiver of claim 17, wherein the processing circuitry comprises a transimpedance amplifier and an analog-to-digital converter in electrical communication with each of the pairs of balanced detectors.

19. The optical coherent receiver of claim 15, wherein the processing circuitry comprises digital signal processor circuitry being configured to process responses detected from the first and second 90-degree optical hybrid mixes based on quadrature phase shift keyed (QPSK) modulation.

20. The optical coherent receiver of claim 15, wherein at least one of the optical hybrids is implemented as a photonic integrated circuit (PIC) device.

* * * * *